(12) United States Patent
Fuechtner et al.

(10) Patent No.: US 9,045,032 B2
(45) Date of Patent: Jun. 2, 2015

(54) DRIVE TRAIN OF A MOTOR VEHICLE

(75) Inventors: Martin Fuechtner, Stuttgart (DE);
Joerg Meyer-Ebeling, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/577,992

(22) PCT Filed: Dec. 9, 2010

(86) PCT No.: PCT/EP2010/007498
§ 371 (c)(1),
(2), (4) Date: Aug. 9, 2012

(87) PCT Pub. No.: WO2011/103898
PCT Pub. Date: Sep. 1, 2011

(65) Prior Publication Data
US 2012/0312620 A1    Dec. 13, 2012

(30) Foreign Application Priority Data

Feb. 23, 2010   (DE) .......................... 10 2010 009 874

(51) Int. Cl.
| | |
|---|---|
| B60K 1/00 | (2006.01) |
| B60K 6/42 | (2007.10) |
| B60K 17/354 | (2006.01) |
| B60K 17/356 | (2006.01) |
| B60K 6/442 | (2007.10) |

(Continued)

(52) U.S. Cl.
CPC ............... B60K 6/442 (2013.01); B60K 17/354 (2013.01); B60K 6/36 (2013.01); B60K 6/40 (2013.01); B60K 6/52 (2013.01); B60K 17/356 (2013.01); Y02T 10/6234 (2013.01); Y02T 10/6265 (2013.01)

(58) Field of Classification Search
CPC ............ B60K 1/00; B60K 6/42; B60K 17/34; B60K 17/354; B60K 17/356; B60K 23/08; B60K 23/0808
USPC .............. 180/243, 245, 246, 247, 248, 65.23, 180/65.235, 65.265, 65.31, 65.6, 233, 239, 180/241, 242, 251
See application file for complete search history.

(56) References Cited

U.S. PATENT DOCUMENTS

| | | | |
|---|---|---|---|
| 6,638,195 B2 * | 10/2003 | Williams | .......................... 477/5 |
| 6,712,734 B1 | 3/2004 | Loeffler | |

(Continued)

FOREIGN PATENT DOCUMENTS

| | | |
|---|---|---|
| DE | 198 50 549 | 5/2000 |
| DE | 10 2004 058 125 | 6/2006 |

(Continued)

*Primary Examiner* — Joseph Rocca
*Assistant Examiner* — Marc A Scharich
(74) *Attorney, Agent, or Firm* — Gerald E. Hespos; Michael J. Porco; Matthew T. Hespos

(57) ABSTRACT

A drive train of a motor vehicle has a front axle (10) and a rear axle (13). An internal combustion engine (16) is positioned behind the front axle (10) and in front of the rear axle (13) in a mid-engine arrangement. A transmission (17) enables the internal combustion engine to drive the rear axle (13). An electric drive (18) is associated with the front axle (10) and has at least two electric machines that can drive the front axle (10). A further electric drive (18) is associated with the rear axle (13) and can drive the rear axle (13) in addition to or alternatively to the internal combustion engine (16).

7 Claims, 1 Drawing Sheet

(51) Int. Cl.
  *B60K 6/36*    (2007.10)
  *B60K 6/40*    (2007.10)
  *B60K 6/52*    (2007.10)

(56)    References Cited

U.S. PATENT DOCUMENTS

| | | | |
|---|---|---|---|
| 7,255,186 | B2 | 8/2007 | Wakuta et al. |
| 8,439,147 | B2 * | 5/2013 | Fuechtner et al. ............ 180/243 |
| 2003/0042054 | A1 * | 3/2003 | Matsubara et al. .......... 180/65.2 |
| 2003/0105872 | A1 | 6/2003 | Han et al. |
| 2007/0158119 | A1 * | 7/2007 | Pascoe ........................ 180/65.2 |
| 2009/0093337 | A1 | 4/2009 | Soliman et al. |
| 2009/0242289 | A1 | 10/2009 | Murty |
| 2010/0025131 | A1 | 2/2010 | Gloceri et al. |

FOREIGN PATENT DOCUMENTS

| | | |
|---|---|---|
| DE | 10 2006 014 514 | 10/2007 |
| DE | 10 2006 026 916 | 2/2008 |
| JP | 11-208304 | 8/1999 |
| WO | 2007/042109 | 4/2007 |
| WO | 2007/118082 | 10/2007 |

* cited by examiner

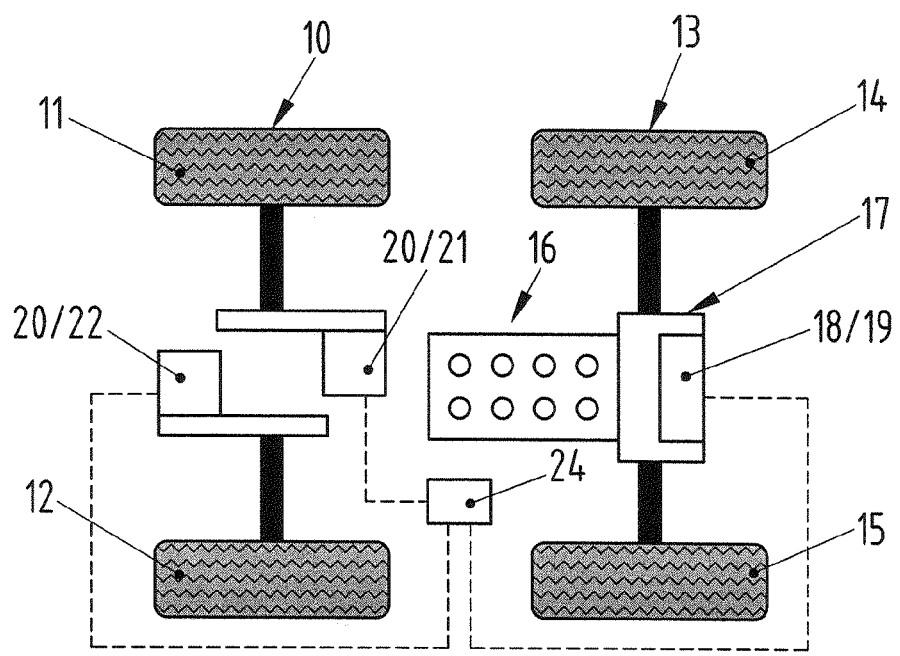
Fig. 1
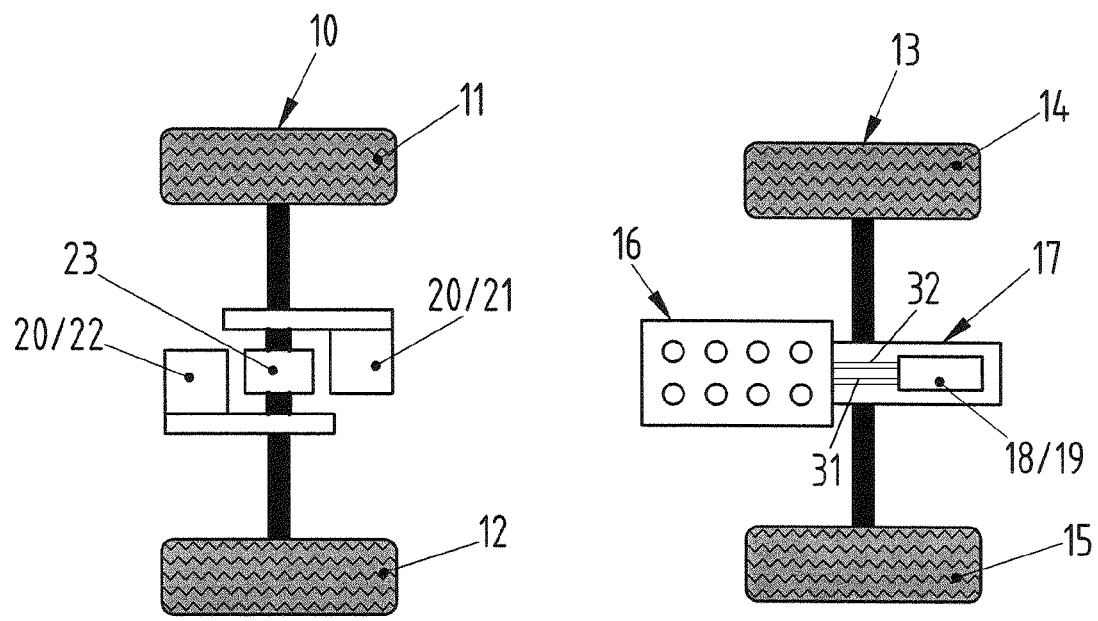
Fig. 2
Fig. 3

DRIVE TRAIN OF A MOTOR VEHICLE

BACKGROUND OF THE INVENTION

1. Field of the Invention.

The invention relates to a drive train of a motor vehicle having front and rear axles, an engine between the axles, a transmission that enables the engine to drive the rear axle and an electric drive for driving the front axle.

2. Description of the Related Art.

DE 10 2006 026 916 A1 discloses a drive train of a motor vehicle having a front axle and a rear axle, wherein the front axle can be driven by an electric drive which is assigned to the front axle, and the rear axle can be driven by an internal combustion engine which is assigned to the rear axle. The internal combustion engine which is assigned to the rear axle is positioned in a mid-engine arrangement behind the front axle and in front of the rear axle and inputs drive into the rear axle via a transmission which is positioned behind the rear axle. The electric drive which is assigned to the front axle may have a single electric machine or a separate electric machine per front wheel.

In the drive train according to DE 10 2006 026 916 A1, the front axle can be driven exclusively by an electric motor and the rear axle exclusively by an internal combustion engine.

Taking this as a basis, the object of the invention is based on the problem of providing a novel drive train of a motor vehicle.

SUMMARY OF THE INVENTION

According to the invention, the rear axle is assigned a further electric drive by means of which the rear axle can be driven in addition to or as an alternative to the internal combustion engine.

In the drive train according to the invention, the rear axle can be driven either in internal combustion engine mode or in electric motor mode. For this purpose, an electric drive is assigned to the rear axle in addition to the internal combustion engine. By means of the electric drive which is assigned to the rear axle it is possible to drive the rear axle in addition to the internal combustion engine or as an alternative to the internal combustion engine. In the drive train according to the invention the front axle is accordingly driven in purely electric motor mode. The rear axle can be driven purely in the electric motor mode, purely in internal combustion engine mode or in a combined internal combustion engine and electric motor mode.

The electric drive which is assigned to the front axle preferably comprises a first electric machine, which is assigned to a first front wheel of the front axle, and a second electric machine, which is assigned to a second front wheel of the front axle, wherein these electric machines of the electric drive which drives the front axle can be coupled to one another via a device. The first electric machine, assigned to the first front wheel, of the electric drive of the front axle serves to drive the first front wheel, and the second electric machine, assigned to the second front wheel, of the electric drive of the front axle serves to drive the second front wheel. Since the two electric machines can be coupled, if one electric machine of the electric drive of the front axle fails, the two front wheels can be driven by means of the remaining electric machine of the electric drive of the front axle.

According to one advantageous development of the invention, the transmission by means of which the internal combustion engine and the electric drive of the rear axle drive the rear axle is embodied as double-clutch transmission with two transmission input shafts and two starter clutches, wherein the electric drive which is assigned to the rear axle comprises at least one electric machine which is integrated into the transmission and wherein the internal combustion engine and the electric machine, integrated into the double-clutch transmission, of the electric drive which is assigned to the rear axle each input drive into different transmission input shafts of the double-clutch transmission. The integration of the electric machine of the electric drive assigned to the rear axle into the double-clutch transmission has the advantage that installation space can be saved. Embodying the transmission as a double-clutch transmission and the fact that the internal combustion engine and the electric machine, which is integrated into the double-clutch transmission, input drive into different input shafts of the double-clutch transmission make it possible to make available a drive train which complies with maximum power demands and furthermore is configured to discharge a minimum amount of pollutants.

The exemplary embodiments of the invention are explained in more detail with reference to the drawing, without being restricted thereto.

BRIEF DESCRIPTION OF THE DRAWINGS

FIG. 1 shows a schematic illustration of an inventive drive train of a motor vehicle.

FIG. 2 shows an alternative to the front axle of the drive train according to the invention in FIG. 1.

FIG. 3 shows an alternative to the rear axle of the drive train according to the invention in FIG. 1.

DETAILED DESCRIPTION OF THE PREFERRED EMBODIMENTS

The present invention here relates to a drive train of a motor vehicle, wherein FIG. 1 is a highly schematic view of a preferred exemplary embodiment of a drive train according to the invention.

The inventive drive train has a front axle 10 with front wheels 11, 12, and a rear axle 13 with rear wheels 14, 15. The rear axle 13 is assigned an internal combustion engine 16 which is positioned in mid-engine arrangement behind the front axle 10 and in front of the rear axle 13, and which drives the rear axle 13 via a transmission 17. The internal combustion engine 16 is a spark ignition internal combustion engine, specifically in the exemplary embodiment shown an 8-cylinder spark ignition internal combustion engine of a V design.

The transmission 17, via which the internal combustion engine 16 drives the rear axle 13, is a double-clutch transmission. The basic design of double-clutch transmissions is familiar to the person skilled in the art referred to here and does not require any further explanation. The basic design of double-clutch transmissions is known, for example, from WO 2007/042109 A1, from which it is apparent that a double-clutch transmission has two transmission input shafts and two starter clutches.

The rear axle 13 is assigned, in addition to the internal combustion engine 16, an electric drive 18 by means of which the rear axle 13 can be driven in addition to or as an alternative to the internal combustion engine 16. The electric drive 18 of the rear axle 13 has at least one electric machine, in the exemplary embodiment shown a single electric machine 19, which is integrated into the transmission 17 which is embodied as a double-clutch transmission. In this context, the internal combustion engine 16 and the electric machine 19, integrated into the double-clutch transmission 17, of the electric drive 18 preferably input drive into different input shafts of the double-clutch transmission 17.

Although the internal combustion engine 16 and the electric machine 19 of the electric drive 18 of the rear axle 13 inputting drive into different transmission input shafts of the transmission 17 which is embodied as a double-clutch transmission is particularly preferred in terms of drive technology, it is alternatively also possible for the internal combustion engine 16 and the electric machine 19 to jointly provide drive to a transmission input shaft of the double-clutch transmission.

In the exemplary embodiment in FIG. 1, the transmission 17 is embodied in a transverse design and accordingly embodied as a transverse transmission whose shafts extend approximately parallel with respect to the rear axle 13. In contrast to this, it is also possible, as can be inferred from FIG. 3, for the transmission 17, which is embodied as a double-clutch transmission, to be embodied in a longitudinal design and accordingly as a longitudinal transmission whose shafts 31, 32 extend approximately perpendicularly with respect to the rear axle 13. In any case, the transmission is seated at least in certain sections on the rear axle 13.

The front axle 10 of the drive train is also assigned an electric drive 20, wherein the electric drive 20 of the front axle 10 comprises a plurality, specifically in the exemplary embodiment shown two, electric machines 21 and 22.

A first electric machine 21 of the electric drive 20 of the front axle 10 is therefore assigned to a first front wheel 11, and a second electric machine 22 of the electric drive 20 of the front axle 10 is assigned to a second front wheel 12. In the exemplary embodiment in FIG. 1, the electric machine 21 of the electric drive 20 serves here exclusively for driving the front wheel 11, and the electric machine 22 of the electric drive 20 of the front axle 10 serves exclusively for outputting power to the front wheel 12.

However, according to one preferred development of the invention it is also possible, as shown in FIG. 2, for the two electric machines 22 and 21 of the electric drive 20 of the front axle 10 to be coupled by means of a device 23. In this case it is then possible, in the event of failure of one of the electric machines 21 or 22 of the electric drive 20 of the front axle 10, for both front wheels 11, 12 of the front axle 10 to be driven by the respectively remaining, functionally capable electric machines 21 and 22 of the electric drive 20 of the front axle 10.

The device 23, via which the two electric machines 21 and 22 of the electric drive 20 of the front axle 10 can be coupled, may be a clutch. In this case, the two front wheels 11, 12 of the front axle 10 are then each driven at identical rotational speeds.

In contrast to this, it is, however, also possible for the device 23, via which the two electric machines 21 and 22 of the electric drive 20 of the front axle 10 can be coupled, to be embodied as a mechanical differential or as an electrical differential.

When the device 23 is embodied as a mechanical differential, the two front wheels 11, 12 of the front axle 10 can be driven at different rotational speeds when the electric machines 21 and 22 are coupled, but a drive torque with an identical sign, that is to say either a traction torque or an overrun torque, is applied to said speeds.

In contrast, if the device 23 is embodied as an electrical differential, the two front wheels 11, 12 can be driven not only at different rotational speeds but also it is also possible to apply torques with different signs to the two front wheels 11, 12, that is to say a traction torque to one front wheel and an overrun torque to another front wheel.

Both the two electric machines 21 and 22 of the electric drive 20 of the front axle 10 and the electric machine 19 of the electric drive 18 of the rear axle 13 can each be operated in motor mode or generator mode. According to FIG. 1, all the electric machines 19, 21 and 22 of the electric drives 18 and 20 of the rear axle 13 and front axle 10 are assigned a common electric energy accumulator 24 here, wherein, when one of the electric machines 19 or 21 or 22 is driven as a motor, said electric machine discharges the electric energy accumulator 24 to a greater extent and when one of the electric machines 19 or 21 or 22 is operated as a generator, said electric machine charges the electric energy accumulator 24 to a greater extent.

In contrast to this, it is also possible to assign separate, electric energy accumulators to the electric drive 18 of the rear axle 13 and to the electric drive 20 of the front axle 10.

The electric energy accumulator, or each electric energy accumulator, is either a battery or a flywheel accumulator. A flywheel accumulator is used if the emphasis is on a high-performance or performance-oriented behavior of the drive train. A battery is used when the emphasis is on a minimized fuel consumption or maximum range of the drive train.

What is claimed is:

1. A drive train of a motor vehicle, comprising a front axle, a rear axle, an internal combustion engine positioned behind the front axle and in front of the rear axle in a mid-engine arrangement, a double-clutch transmission by means of which the internal combustion engine drives the rear axle, an electric drive operably connected to the front axle and comprising at least first and second electric machines by means of which the front axle can be driven, and the rear axle being operably connected to another electric drive having at least a third electric machine integrated into the double-clutch transmission and by means of which the rear axle can be driven in addition to or as an alternative to the internal combustion engine, wherein the double-clutch transmission, by means of which the internal combustion engine and the third electric machine drive the rear axle, is seated on the rear axle and is a longitudinal transmission with two transmission input shafts that are substantially perpendicular to the rear axle.

2. The drive train of claim 1, wherein the double-clutch transmission has two starter clutches.

3. The drive train of claim 1, wherein the internal combustion engine and the third electric machine of the electric drive operably connected to the rear axle each input drive into a respective one of the two transmission input shafts of the double-clutch transmission.

4. The drive train of claim 1, wherein the first electric machine is operably connected to a first front wheel of the front axle, the second electric machine is operably connected to a second front wheel of the front axle, and the first and second electric machines of the electric drive that drives the front axle can be coupled to one another via a device.

5. The drive train of claim 4, wherein the device is a clutch.

6. The drive train of claim 4, wherein the device is a mechanical differential.

7. The drive train of claim 4, wherein the device is an electrical differential.

* * * * *